(12) United States Patent
Belenko

(10) Patent No.: US 7,929,707 B1
(45) Date of Patent: *Apr. 19, 2011

(54) USE OF GRAPHICS PROCESSORS AS PARALLEL MATH CO-PROCESSORS FOR PASSWORD RECOVERY

(75) Inventor: Andrey V. Belenko, Moscow (RU)

(73) Assignee: Elcomsoft Co. Ltd., Moscow (RU)

( * ) Notice: Subject to any disclaimer, the term of this patent is extended or adjusted under 35 U.S.C. 154(b) by 443 days.

This patent is subject to a terminal disclaimer.

(21) Appl. No.: 12/204,414

(22) Filed: Sep. 4, 2008

Related U.S. Application Data

(60) Provisional application No. 60/970,277, filed on Sep. 6, 2007.

(51) Int. Cl.
*H04C 9/08* (2006.01)
(52) U.S. Cl. .................................................... 380/286
(58) Field of Classification Search .................. 380/30, 380/28, 44; 726/24; 713/184; 708/492
See application file for complete search history.

(56) References Cited

U.S. PATENT DOCUMENTS

| | | | | |
|---|---|---|---|---|
| 4,870,681 | A * | 9/1989 | Sedlak | 380/30 |
| 6,408,075 | B1 * | 6/2002 | Ohki et al. | 380/28 |
| 6,735,611 | B2 * | 5/2004 | Vanstone | 708/492 |
| 7,430,293 | B2 * | 9/2008 | Elbe et al. | 380/44 |
| 2006/0167915 | A1 * | 7/2006 | Furlong et al. | 707/101 |
| 2006/0242710 | A1 * | 10/2006 | Alexander | 726/24 |
| 2010/0058067 | A1 * | 3/2010 | Schneider | 713/184 |

* cited by examiner

*Primary Examiner* — Kambiz Zand
*Assistant Examiner* — Abiy Getachew
(74) *Attorney, Agent, or Firm* — Bardmesser Law Group

(57) ABSTRACT

In a computer system having a central processing unit (CPU) and a graphics processing unit (GPU), a system, method and computer program product for recovering a password used to encrypt a plaintext, including (a) generating N passwords on the CPU; (b) providing the N passwords to the GPU; (c) for each of the N passwords, calculating a transformed value from the password on the GPU, wherein the calculating is performed in parallel for all the N passwords provided to the GPU; (d) providing the N transformed values to the CPU; (e) at the CPU, testing the N transformed values for correctness; and (f) if none of the N transformed values are correct, repeating steps (a)-(e) for the next set of N passwords; (g) informing the user of a correct password.

6 Claims, 5 Drawing Sheets

FIG. 1
FIG. 2
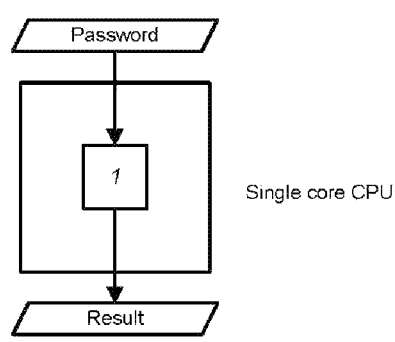
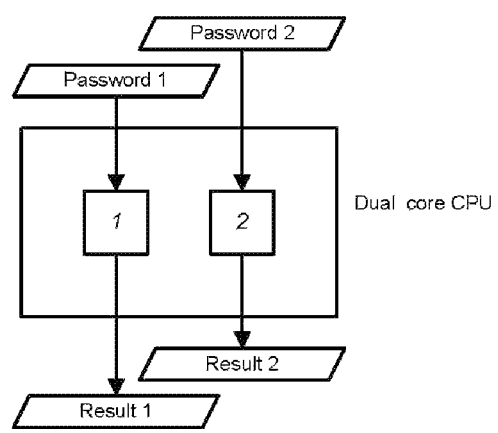
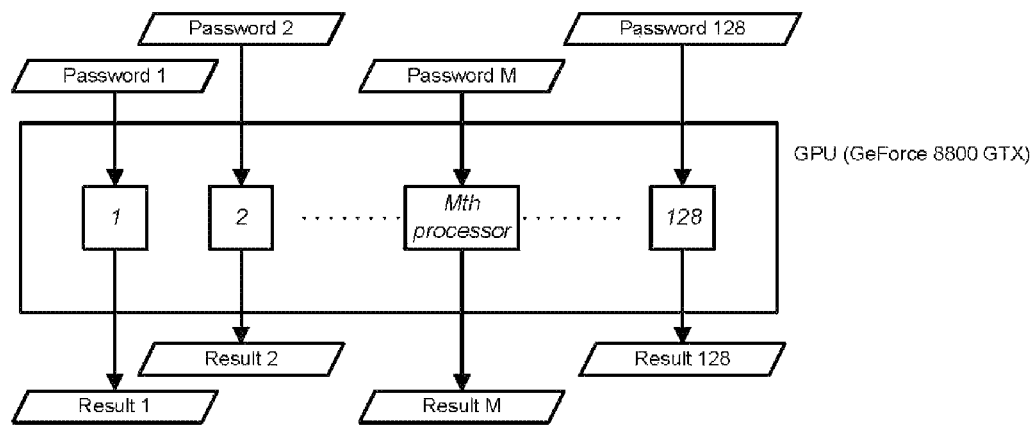
FIG. 3

USE OF GRAPHICS PROCESSORS AS PARALLEL MATH CO-PROCESSORS FOR PASSWORD RECOVERY

CROSS-REFERENCE TO RELATED APPLICATIONS

This application is claims the benefit of U.S. Provisional Application for Patent No. 60/970,277 entitled USE OF GRAPHICS PROCESSORS FOR PASSWORD RECOVERY, filed on Sep. 6, 2007, which is incorporated by reference herein in its entirety.

BACKGROUND OF THE INVENTION

1. Field of the Invention

The present invention is related to cryptography, and, more particularly, to recovery of encrypted information using a graphical processing unit of a computer as a co-processor.

2. Description of the Related Art

Password recovery, password audits, cryptographic algorithm tasks and cryptographic protocol tasks are all tasks that are extremely demanding on the computational technology. Verifying the correctness of a single password can require tens of thousands of cryptographic transformations, such as hash functions or encryptions. A typical attempt to recover a password or to conduct a password audit requires testing hundreds of millions of passwords, which is a very heavy computational burden on the computer processor.

Traditionally, all such calculations were done on the computer's central processing unit, or CPU, since the hardware and software mechanisms for implementing such operations on other elements of the computer hardware were typically absent. One exception was certain hardware/printed circuit boards, which were specialized for particular tasks (e.g., IBM 4764 PCI-X Cryptographic Coprocessor, Sun Crypto Accelerator 6000 Board, which is typically used to offload SSL processing from CPUs on servers), however, such hardware is generally rare and has not found widespread acceptance. Recently, software began appearing that would take advantage of the capabilities of the graphical processing units (GPUs) of desktop computers. Such graphical processing units are part of a desktop computer's video card. The selection of such GPUs for some of these tasks was not accidental, since working with three-dimensional graphics and rendering of images typically requires advanced computational capabilities.

Thus, just as the capability of the CPUs increases from year to year, the capabilities of the graphics processors also improve continuously from year to year, and the amount of memory available on a typical video card also increases. For example, in 2007, there were video cards available with 1.5 gigabytes of video random access memory. However, earlier approaches to the use of GPUs for some calculation intensive tasks outside of video graphics processing were unsuitable for implementing cryptographic primitives, and therefore, were unsuitable for password recovery and password audit. The problem with GPUs was that they were adapted for processing of floating point calculations, and were generally not suitable for performing integer calculations (or at least, when performing the integer calculations, the performance of a GPU was not sufficiently better than the performance of a CPU).

Such GPUs therefore could not easily work with cryptographic primitives, which require implementing integer functions and integer operations, not floating point operations.

SUMMARY OF THE INVENTION

Accordingly, the present invention is related to a system and method for using graphics processors for cryptographic attack that substantially obviates one or more of the disadvantages of the related art.

In one aspect, in a computer system having a central processing unit (CPU) and a graphics processing unit (GPU), there is provided a system, method and computer program product for recovering a password used to encrypt a plaintext, including (a) generating N passwords on the CPU; (b) providing the N passwords to the GPU; (c) for each of the N passwords, calculating a transformed value from the password on the GPU, wherein the calculating is performed in parallel for all the N passwords provided to the GPU; (d) providing the N transformed values to the CPU; (e) at the CPU, testing the N transformed values for correctness; and (f) if none of the N transformed values are correct, repeating steps (a)-(e) for the next set of N passwords; (g) informing the user of a correct password.

In another aspect, in a computer system having a central processing unit (CPU) and a graphics processing unit (GPU), a method of recovering a password used to encrypt a plaintext includes (a) generating a plurality of passwords on the CPU; (b) providing the plurality of password to the GPU; (c) for each of the plurality of passwords, calculating a hash value from the password on the GPU, wherein the calculating is performed in parallel for all the generated passwords; (d) at the CPU, testing the hash values for correctness; (e) if none of the hash values are correct, repeating steps (a)-(d) for the next set of passwords, until the correct password is found; and (f) informing the user of a correct password.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 1 illustrates a conventional brute force password verification;

FIG. 2 illustrates a dual core brute force password verification;

FIG. 3 illustrates using a video card GPU for brute force password verification;

DETAILED DESCRIPTION OF THE PREFERRED EMBODIMENTS

Figure 4:
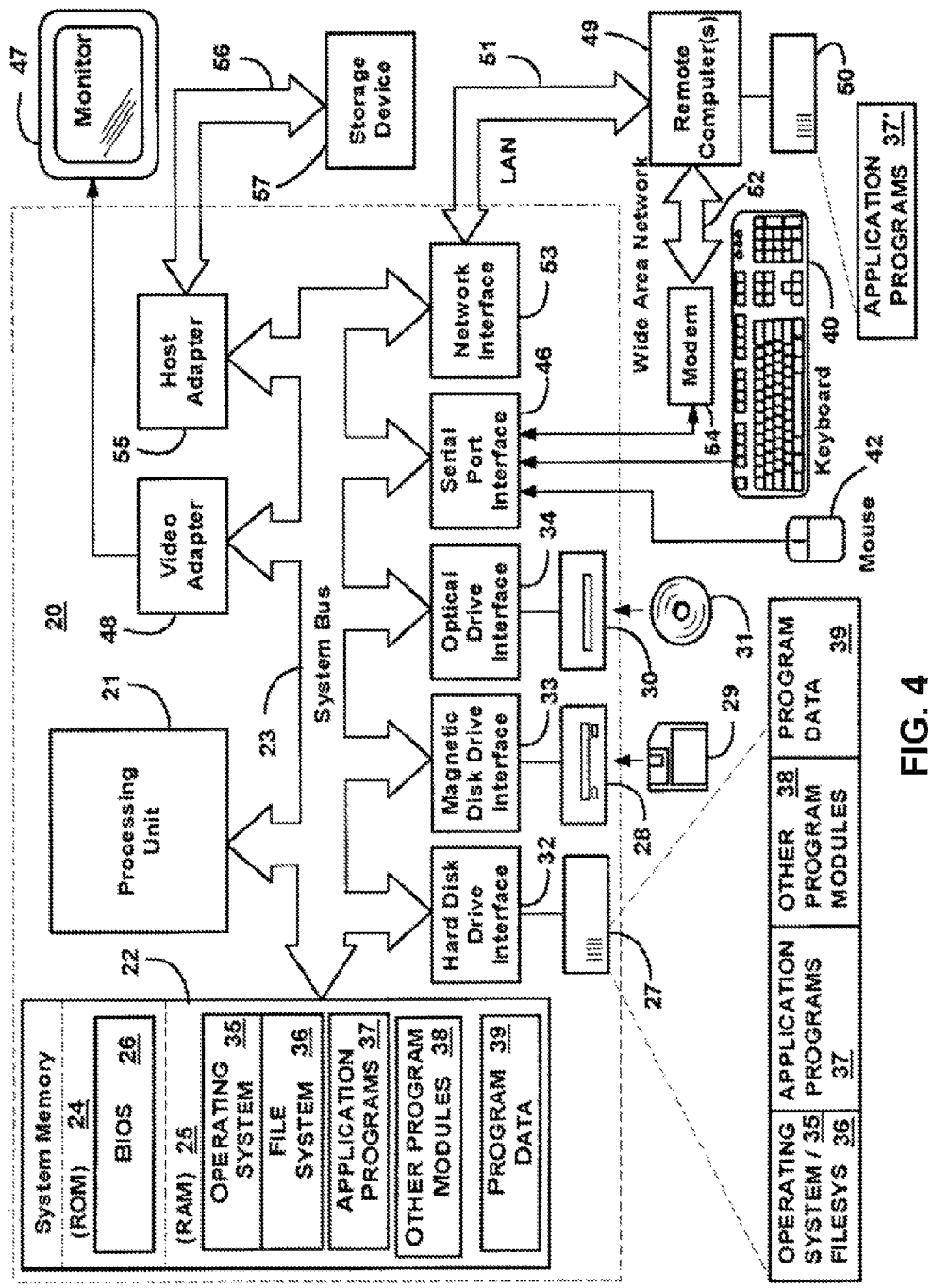
FIG. 4 illustrates a schematic of a computer system on which the invention can be implemented according to one embodiment of the invention.

Reference will now be made in detail to the embodiments of the present invention, examples of which are illustrated in the accompanying drawings.

In the fall of 2006, NVidia announced the second generation of graphics processors, under the code name CUDA (compute unified device architecture). In February of 2007, NVidia issued a preliminary version of software for CUDA (version 0.8), and in June 2007, a final version (version 1.0) was released. Unlike first generation graphics processors, CUDA permits working not only with floating point numbers, but also with integer type data. Depending on the capabilities of the GPU and depending on how efficiently a particular algorithm is implemented, performing the calculations in a GPU permits an increase in speed on the order of 10-50 times. At the moment, only GPUs sold by NVIDIA (GeForce 8-, 9- and 200-Series, Quadro FX cards and Tesla devices) are adapted for these functions, although it is expected that other graphics cards, from NVidia and other manufacturers, will soon also support these capabilities. See NVIDIA developer's site, CUDA development kits and documentation: http.**delveloper*nvidia*com*object*cuda*html, incorporated herein by reference in its entirety.

It will also be appreciated that although the discussion herein primarily uses NVIDIA graphics adapters as an example, the invention is not limited to NVIDIA's chip sets and graphics and adapters from other manufacturers can also be used for the same purpose. For example, ATI graphics adapters, together with their CAL (compute abstraction layer) is also suitable for the cryptographic applications discussed herein. Also, Intel's Larrabee graphics processor expected shortly, is also usable for the applications described herein.

Additionally, the DirectX specification version 10 contemplates integer support and a unified shader model. Thus, the key insight here is that integer support on the processors of the GPU can be used to implement the cryptographic primitives. Also, the unified shader model permits the GPU to be programmed in a special language, which can also be adapted to calculation of cryptographic primitives, specifically, for password recovery. Note also that the major advantage of DirectX version 10 is that it is substantially hardware platform independent, and any DirectX version 10 compatible code will work on any platform that supports DirectX V10. Also, OpenGL can be used for similar purposes, such that the password recovery solution described herein can be ported across platforms and across operating systems.

Also, external GPUs can be added to a computer (in addition to the internal GPU), thereby increasing the number of processors that can process the cryptographic primitives in parallel. Current systems support up to 4 external GPUs, although there is, in theory, no limit to how many external GPUs can be connected to a computer.

A modern GPU consists of a large number of processors, and represents a massively parallel machine. For example, the number of processors in GPU of the GeForce 8 family varies from 16 (GeForce 8500 GT) to 128 (GeForce 8800 GTX and GeForce 8800 Ultra). The processors are combined into blocks of 8 processors, and each such block is referred to as a "multiprocessor." Each multiprocessor has its own set of registers, memory shared between the processors, and a cache for accelerated access to memory and to constants.

From the perspective of a software developer, a GPU is a computational device that is capable of performing identical mathematical operations in parallel, on a very large number of data streams. If the same program performs the same exact operations for different data, then a corresponding part of that program can be performed on the GPU. In effect, the GPU functions as a co-processor for the CPU.

GPUs are typically a "good fit" for implementing algorithms that are computationally intensive in terms of the number of operations required, and which generally have a relatively small amount of input data and output data.

Many cryptographic transformations and functions can be implemented quite efficiently on a GPU. In particular, algorithms that use 32-bit integer arithmetic, and which do not require a large amount of random access memory, are particularly well suited to being implemented on a graphics processor. Examples of such algorithms are hash functions MD4, MD5, RIPEMD, SHA-1, SHA-256 and related hash functions, cryptographic algorithms RC5 and RC6, and so on. Generally, algorithms that require a great deal of memory, or that require intensive reads and writes to memory, are not as well suited to be implemented on graphics processors. This is particularly true if the basic element of such an algorithm does not evenly fit into 4N bytes. Examples of such algorithms are RC4 ciphers and the MD2 hash functions. For general discussion of use of GPUs for cryptographic applications, see *Remotely Keyed Cryptographics Secure Remote Display Access Using (Mostly) Untrusted Hardware*, http://www.ncl.cs.columbia.edu/publications/icics2005.pdf, *Secret Key Cryptography Using Graphics Cards* http://www.cs.columbia.edu/~library/TR-repository/reports/reports-2004/cucs-002-04.pdf, *Using Graphic Processing Unit in Block Cipher Calculations* http://dspace.utlib.ee/dspace/bitstream/10062/2654/1/rosenberg_urmas.pdf, *Using Modern Graphics Architectures for General-Purpose Computing: A Framework and Analysis* http://www.cs.washington.edu/homes/oskin/thompson-micro2002.pdf, *AES Encryption Implementation and Analysis on Commodity Graphics Processing Units* https://www.cs.tcd.ie/~harrisoo/publications/AES_On_GPU.pdf, *dnetc RC5-72+nvidia 8800 GTX*=144 *Mkeys/sec*, http://episteme.arstechnica.com/eve/forums/a/tpc/f/122097561/m/766004683831, *OpenSSL-GPU*, http://math.ut.ee/~uraes/openssl-gpu/, http://www.gpgpu.org/.

Password recovery, particularly where a "brute force" approach is used, generally involves calculating some value (i.e., transformation of the password, often using hash functions) based on each possible password, and then testing whether that value is correct. In the general case, such a task is well suited to GPU architecture: the GPU works on multiple data streams, where each processor of the GPU performs calculations, and tests only a single password. For example, one possible algorithm for testing N passwords works as follows:

1. generate N passwords on a CPU;
2. write the generated N password into GPU memory;
3. launch N threads on the GPU;
4. get results of N transformations from GPU memory; and
5. test each of the results on the CPU.

In practice, such an algorithm will work well sometimes, but not other times. In the case where the password transformation function is relatively simple, and can be performed by the GPU at the rate of several million transformations per second (for example the 8600 GTS video card can perform approximately 75 million MD5 transformations per second), then the bottleneck of the entire algorithm becomes the copying of the data to the GPU and back to the CPU. In this case, it is clear that the algorithm above needs to be modified, in order to minimize the amount of data passed back and forth between the GPU and the CPU.

A modified algorithm for testing and passwords can be as follows:

1. write data required to check transformation result for correctness into GPU memory;
2. generate an initial password on a CPU;
3. write the initial password into GPU memory;
4. start N threads on the GPU;
5. receive the correct password from the GPU memory back to the CPU.

It should be noted that in this case, each thread on the GPU, except for the actual password transformation, needs to generate the password to be tested, and then test the results of the transformation for identity with the result in step 1 of the algorithm. This modified algorithm reduces the demand on the speed of copying of data between the CPU and the GPU to a minimum.

Despite the fact that the modified algorithm requires a fairly large number of Boolean and integer arithmetic operations on the GPU, the speed of the algorithm turns out to be considerably higher than the unmodified algorithm, because the overhead associated with copying of data between the CPU and the GPU is dramatically reduced. The greater the speed of password transformation, the greater the difference.

One factor that limits the application of the modified algorithm is the fact that it can only be used for a brute force approach, where each possible password needs to be tested sequentially, or sequentially/parallel. The first (unmodified) algorithm above is not limited to this, because any set or subset of passwords can be written to GPU memory, for example, passwords from a dictionary, or any other heuristics-based subset of all possible passwords. In general, the applicability of graphics processors to password recovery for particular software products, as well as the degree of acceleration that is possible to achieve due to performing the calculations in the GPU, are determined primarily by the cryptographic primitives that a particular product uses for password testing. The following table lists some of the exemplary products, and the applicability of the approach described herein to these products:

| Product | Algorithm | | Applicable? |
|---|---|---|---|
| Microsoft Windows | DES, MD4 | | YES |
| Microsoft Office | 97-2003 | MD5, RC4 | YES for both |
| | 2000-2003 | MD5, SHA1, DES, AES | YES |
| | 2007 | SHA1, AES | YES |
| PGP | CAST, IDEA, RC2, DES, 3DES, Twofish, Blowfish, AES, MD2, MD5, RIPEMD, SHA1, SHA2, RSA, DSA, El-Gamal | | YES |
| Adobe PDF | <1.4 | MD5, RC4 | YES for both |
| | 1.4-1.8 | MD5, RC4, AES | YES for at least MD5 and RC4 |
| | >= 1.8 | SHA2, AES | YES |
| ZIP | SHA1, AES | | YES |
| RAR | SHA1, AES | | YES |
| WPA, WPA2 | SHA1, MD5 | | YES |
| Open Office | SHA1 | | YES |
| Unix Crypt( ) | DES, MD5, Blowfish | | YES |
| Oracle | DES, SHA1 | | YES |
| MS SQL | SHA1 | | YES |

Note that Microsoft Office versions 2000 and older, as well as Adobe Acrobat versions 1.4 and older can use cryptoproviders (CSPs) installed in the system. In that case, algorithms implemented on those cryptoproviders can be added to the list above.

Figure 5:
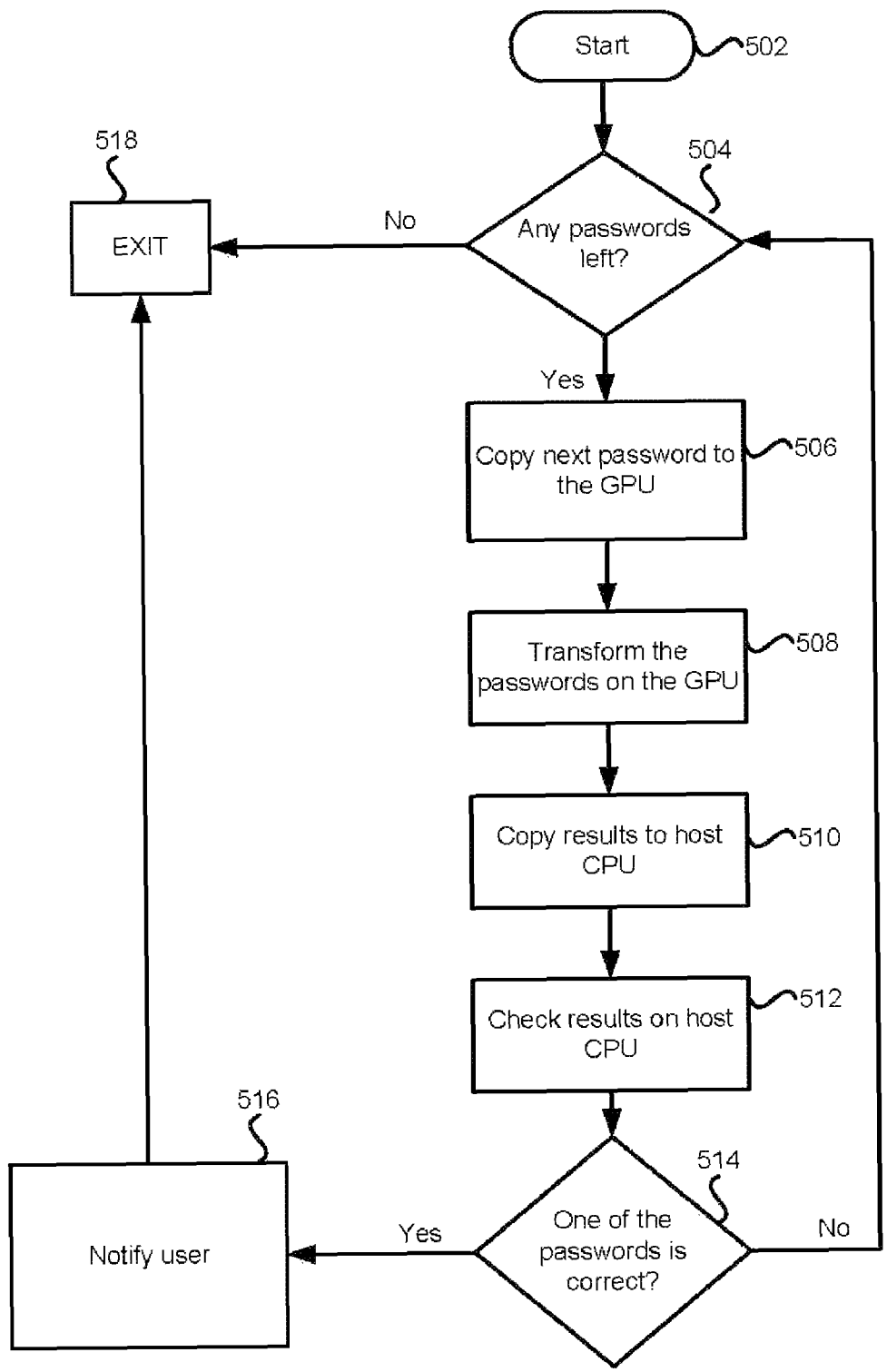
FIGS. 5-7 illustrate flow charts of exemplary embodiments of the invention.

FIG. 5 illustrates one of the exemplary algorithms discussed above. In FIG. 5, the algorithm starts at step 502. In step 504, if all the passwords have already been checked the algorithm exits at step 518. If there are still passwords left to be checked, then, in step 506, the next set of passwords is copied to the GPU. In step 508, passwords are transformed on the GPU (i.e., for example, a hash of the password is generated). In step 510, the result of the transformation is copied back to the host CPU. In step 512, the results are checked on the CPU. In step 514, if one of the passwords is correct, then user is notified, in step 516. Otherwise, the algorithm returns back to step 504.

Figure 6:
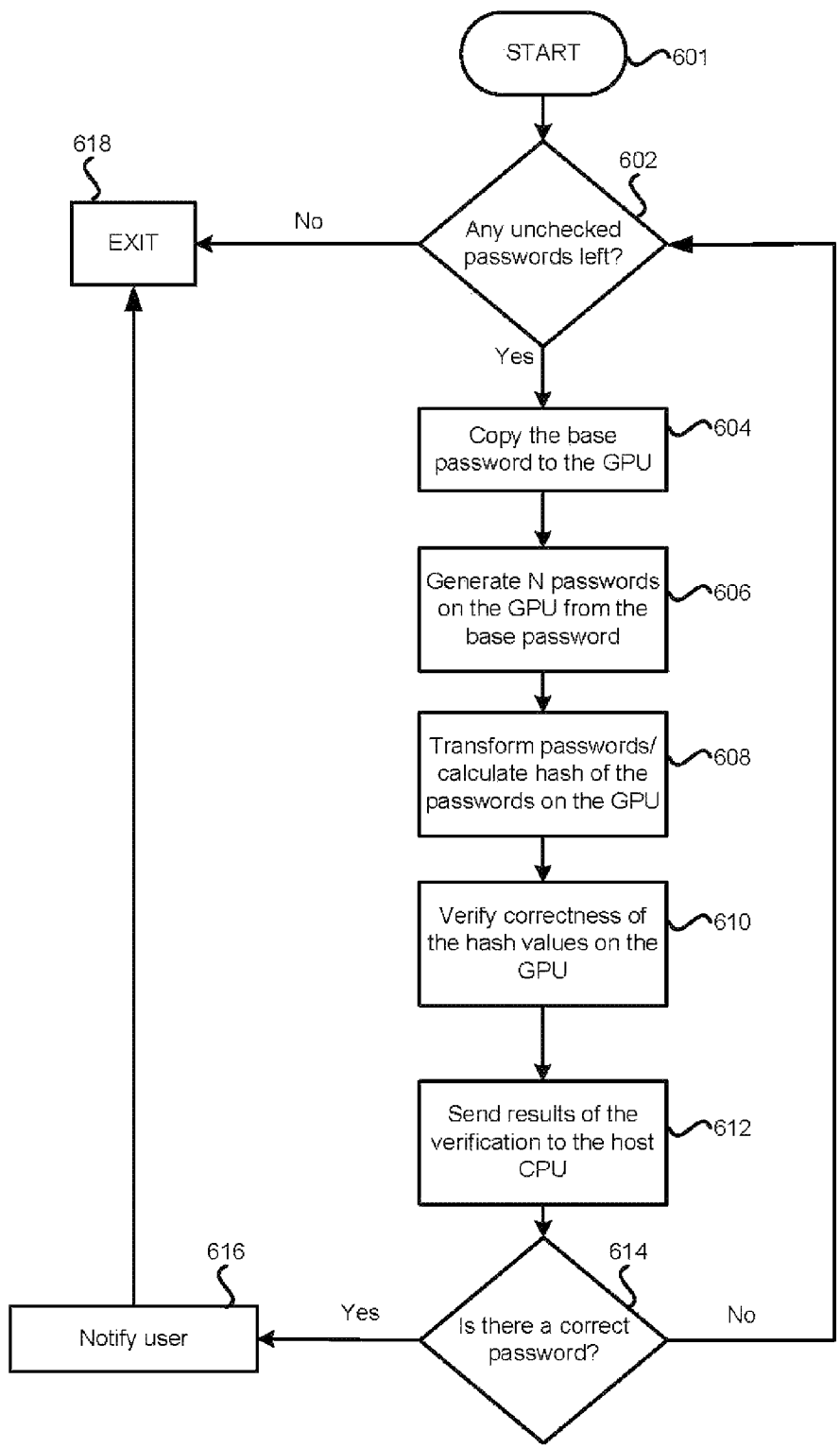

FIG. 6 illustrates another embodiment of the algorithm of the present invention. The algorithm starts in step 601. In step 602, if there are no passwords left to be checked, the algorithm exits in step 618. Otherwise, the base password is copied to the GPU, in step 604. A set of N passwords are generated on the GPU from the base password, in step 606. In step 608, the passwords are transformed, or hashes are calculated from the passwords, using the GPU. In step 610, the correctness (or incorrectness) of the hash values is verified on the GPU. In step 612, the results of the verification are sensed through the host CPU. In step 614, if there is a correct password found, then the user is notified in step 618, and the algorithm exits. Otherwise, the algorithm returns to step 602.

Generally, the above approaches can be divided into two types. The first type is the case where the passwords are generated on the CPU, then copied to the GPU. The passwords are then transformed (typically, hashed) on the GPU, the results are copied back to the CPU, and are then checked on the CPU. A second type is where the initial password is generated on the CPU, and then written to the GPU. Additional passwords are then generated on the GPU, transformed, the results are checked on the GPU, and the correct passwords, if found, is copied back to the CPU. The first approach can be utilized for virtually any type of cryptographic attack, such as brute force, mask or dictionary attack. The second approach can be applied to brute force attack and the mask attack.

Figure 7:
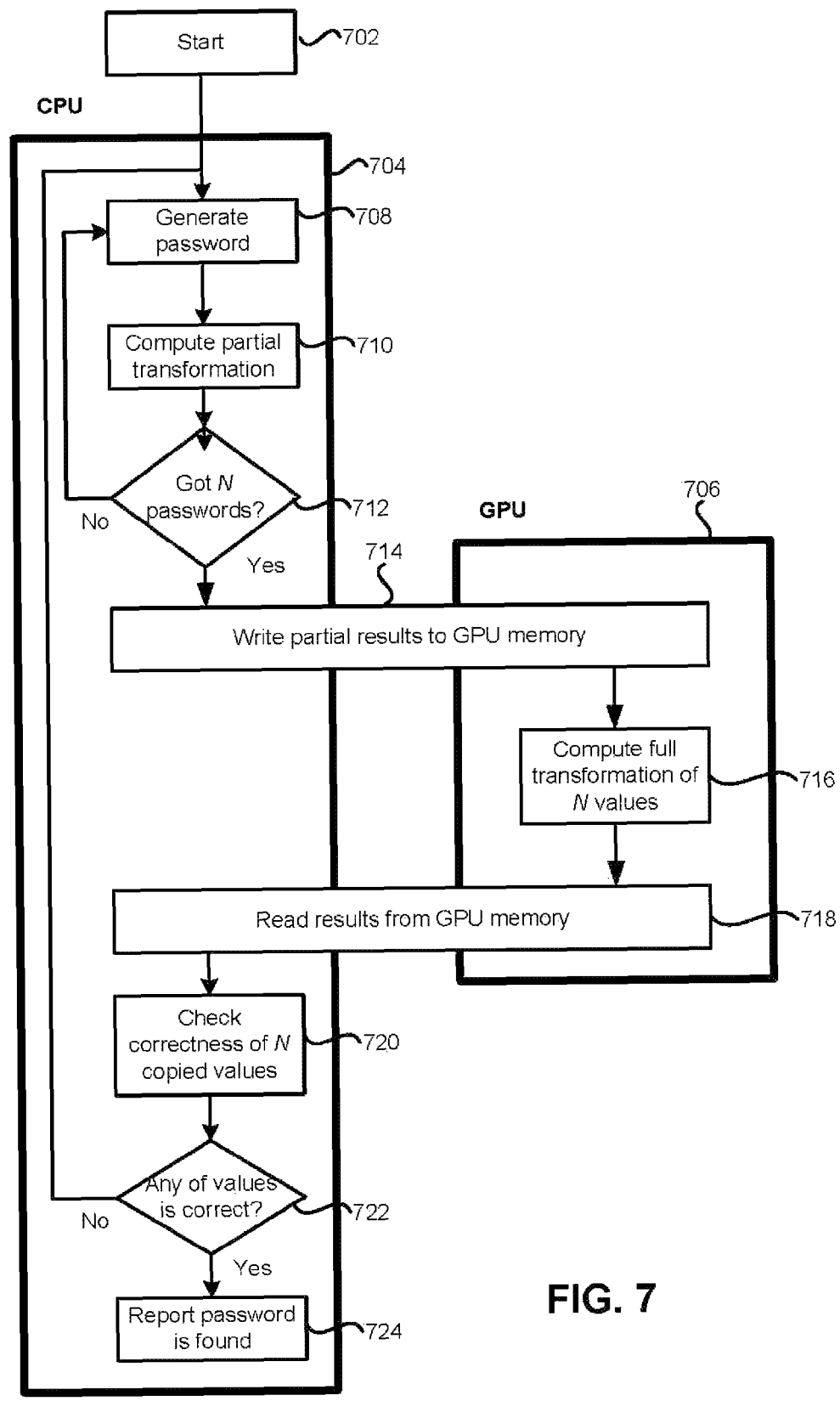

Yet another possible approach is where a "slow" password checking algorithm is used. Here, a situation can arise where no more than a few thousand passwords per second can be checked on the CPU. For example, Microsoft Office 2007, PGP, WPA and similar cryptographic products fall into this category. All of these approaches use iterative hashing, in other words, the password transformation looks as follows:

$H_0$=Hash(Password);
For i=1 To count Do
$H_i$=Hash($H_{i-1}$);
Result=$H_{count}$;

The result is then checked for correctness. In order to accelerate the cryptographic attack if a GPU is available, the first hash can be computed on the CPU. The hash is then copied to the GPU, to perform iterative hashing on the GPU, and the results are then read back to the CPU, and checked for correctness. In this case, the passwords are generated on this CPU, and there is no limitation on attack type—it can be any of a brute force, mask or dictionary, or any other. Thus, the slow iterative hash in algorithm looks as follows, see FIG. 7:

In step 702, the algorithm begins. In step 708, a password is generated on the CPU 704. In step 710, partial transformation is calculated. In step 712, the algorithm checks if N passwords have been generated. If not, more passwords are generated, and more transformations are completed. In step 714, the partial results are written to the GPU memory. In step 716, on the GPU 706, full transformation of N passwords is performed. In step 719, the results are transferred back to the CPU 704, from the GPU 706. The CPU then checks for correctness of any of the N passwords, in step 720. In step

722, if none of the values are correct, the algorithm returns to step 708. Otherwise, in step 724, the correct password is reported to the user.

In this case, the GPU is acting as a math coprocessor for generating iterative hashes, and can overlap its operations with the CPU, so that there is almost no performance penalty for partially computing the hashes on the CPU 704.

An exemplary implementation for MD5 hash brute force password attack is shown below:

```
#include <stdio.h>
#include <windows.h>
#include <cuda_runtime_api.h>
extern "C" void runKernel(int nGrid[3], int nThreads[3], void*pdOut);
extern "C" unsigned short d_aCharset[256];
extern "C" unsigned int d_nCharsetLen;
extern "C" unsigned int d_nPasswordInd[32];
extern "C" unsigned int d_nPasswordLen;
extern "C" uint4 d_CorrectHash;
#define NUM_PASSWORDS 1048576
int main(int argc, char*argv[ ])
{
    int deviceCount=0;
    cudaError rc;
    rc=cudaGetDeviceCount(&deviceCount);
    if(rc!=cudaSuccess)
    {
        printf("!cudaGetDeviceCount( ) failed: % s\n", cudaGetErrorString(rc));
        return 0;
    }
    printf("+Number of CUDA devices present: % d\n", deviceCount);
    WCHAR*pData=new WCHAR[NUM_PASSWORDS*8];
    memset(pData, 0, NUM_PASSWORDS*16);
    void*pdData=NULL;
    rc=cudaMalloc(&pdData, NUM_PASSWORDS*16);
    if(rc!=cudaSuccess)
    {
        printf("!cudaMalloc(&pdData) failed: % s\n", cudaGetErrorString(rc));
        delete[ ] pData;
        return 0;
    }
    WCHAR wCharset[ ]=L"ABCDEFGHIJKLMNOPQRSTUVWXYZ";
    unsigned int nCharsetLen=wcslen(wCharset);
    unsigned int nPwdInd[32]={0};
    unsigned int nPwdLen=6;
    rc=cudaMemcpyToSymbol("d_aCharset", wCharset, nCharsetLen*2);
    if(rc!=cudaSuccess)
    {
        printf("!cudaMemcpyToSymbol( ) failed: % s\n", cudaGetErrorString(rc));
        delete[ ] pData;
        cudaFree(pdData);
        return 0;
    }
    rc=cudaMemcpyToSymbol("d_nCharsetLen", &nCharsetLen, 4);
    if(rc!=cudaSuccess)
    {
        printf("!cudaMemcpyToSymbol( ) failed: % s\n", cudaGetErrorString(rc));
        delete[ ] pData;
        cudaFree(pdData);
        return 0;
    }
    rc=cudaMemcpyToSymbol("d_nPasswordInd", nPwdInd, 32*4);
    if(rc!=cudaSuccess)
    {
        printf("!cudaMemcpyToSymbol( ) failed: % s\n", cudaGetErrorString(rc));
        delete[ ] pData;
        cudaFree(pdData);
        return 0;
    }
    rc=cudaMemcpyToSymbol("d_nPasswordLen", &nPwdLen, 4);
    if(rc!=cudaSuccess)
    {
        printf("!cudaMemcpyToSymbol( ) failed: % s\n", cudaGetErrorString(rc));
        delete[ ] pData;
        cudaFree(pdData);
        return 0;
    }
    //Put here MD5 hash of password you want to recover
    BYTE bCorrectHash[16]={0x19, 0x0c, 0x27, 0xfd, 0x35, 0x1d, 0xef, 0xfa, 0x5c, 0xe3, 0x8b, 0x4d, 0x7b, 0x6d, 0xc4, 0x47};
    rc=cudaMemcpyToSymbol("d_CorrectHash", bCorrectHash, 16);
    if(rc!=cudaSuccess)
    {
        printf("!cudaMemcpyToSymbol( ) failed: % s\n", cudaGetErrorString(rc));
        delete[ ] pData;
        cudaFree(pdData);
        return 0;
    }
    int nGrid[3]={1024, 256, 1};
    int nThreads[3]={24, 16, 1};
    int nNumThreads=nGrid[0]*nGrid[1]*nGrid[2]*nThreads[0]*nThreads[1]*nThreads[2];
    printf("+Executing kernel . . . \n");
    WCHAR strCurPwd[16]={0};
    WCHAR strResult[32]={0};
    while(1)
    {
        for(int i=0; i<nPwdLen; i++)
            strCurPwd[i]=wCharset[nPwdInd[i]];
        printf("Current password: % S\n", strCurPwd);
        runKernel(nGrid, nThreads, pdData);
        Sleep(2000);
        rc=cudaThreadSynchronize( )
        if(rc!=cudaSuccess)
        {
            printf("!Kernel execution failed: % s\n", cudaGetErrorString(rc)
            delete[ ] pData;
            cudaFree(pdData);
            return 0;
        }
        rc=cudaMemcpy(strResult, pdData, 64, cudaMemcpyDeviceToHost);
        if(rc!=cudaSuccess)
        {
            printf("!cudaMemcpy( )(H<-D) failed: % s\n", cudaGetErrorString(rc));
            delete[ ] pData;
```

```
    cudaFree(pdData);
    return 0;
  }
  cudaMemset(pdData, 0, 64);
  if(strResult[0] !=0)
  {
    printf("+Password found: % S\n", strResult);
    break;
  }
  //Update nPwdInd
  unsigned int nCarry=nNumThreads;
  unsigned int nTmp;
  for(int i=0; i<nPwdLen; i++)
  {
    nTmp=(nPwdInd[i]+nCarry) % nCharsetLen;
    nCarry=(nPwdInd[i]+nCarry)/nCharsetLen;
    nPwdInd[i]=nTmp;
  };
  //Store nPwdInd
  rc=cudaMemcpyToSymbol("d_nPasswordInd",
      nPwdInd, 32*4);
  if(rc!=cudaSuccess)
  {
    printf("!cudaMemcpyToSymbol( ) failed: % s\n",
        cudaGetErrorString(rc));
    delete[ ] pData;
    cudaFree(pdData);
    return 0;
  }
};
if(rc!=cudaSuccess)
{
  printf("!Kernel launch failure: % s\n", cudaGetErrorString(rc));
  delete[ ] pData;
  cudaFree(pdData);
  return 0;
}
//Read results
rc=cudaMemcpy(pData, pdData, 16*NUM_PASSWORDS, cudaMemcpyDeviceToHost);
if(rc!=cudaSuccess)
{
  printf("!cudaMemcpy( )(H<-D) failed: % s\n", cudaGetErrorString(rc));
  delete[ ] pData;
  cudaFree(pdData);
  return 0;
}
printf("+Kernel successfully executed\n");
for(int i=0; i<nNumThreads; i++)
{
  BYTE*pHash=(BYTE*)pData+16*i;
}
delete[ ] pData;
cudaFree(pdData);
return 0;
}
```

Below is an example of code that runs on a GPU and implements password checking (as described in "Modified Algorithm" above). This code can be compiled with NVIDIA compiler:

```
_constant_unsigned short d_aCharset[256];
_constant_unsigned int d_nCharsetLen;
_constant_unsigned int d_nPasswordInd[32];
_constant_unsigned int d_nPasswordLen;
_constant uint4 d_CorrectHash;
_device_void md5_transform(void*pData, uint4& hash);
_global_void
md5pass_kernel(void*pdOut);
extern "C" void runKernel(int nGrid[3], int nThreads[3],
    void*pdOut) {
  dim3 grid(nGrid[0], nGrid[1], nGrid[2]);
  dim3 threads(nThreads[0], nThreads[1], nThreads[2]);
  md5pass_kernel<<<grid, threads>>>(pdOut);}
_global_void md5pass_kernel(void*pdOut) {
  int threadId=threadIdx.x+threadIdx.y*blockDim.x;
  int         tid=(blockIdx.x+blockIdx.y*gridDim.x)*
      (blockDim.x*blockDim.y)+threadId;
  unsigned short aPwd[32]={0};
  uint4 hash;
  int i=0;
  unsigned int nCarry=tid;
  for(i=0; i<d_nPasswordLen; i++)
  {
    unsigned int nTmp;
    nTmp=(d_nPasswordInd[i]+nCarry)                 %
        d_nCharsetLen;
    nCarry=(d_nPasswordInd[i]+nCarry)/d_nCharsetLen;
    aPwd[i]=d_aCharset[nTmp];
  };
  if(nCarry >0)
  {
    //this means password length should be increased return;
  }
  //message padding
  aPwd[i]=0x80;
  //message length
  aPwd[28]=d_nPasswordLen*16;
  md5_transform((void*)aPwd, hash);
  if((hash.x==d_CorrectHash.x) &&
      (hash.y==d_CorrectHash.y) &&
      (hash.z==d_CorrectHash.z) &&
      (hash.w==d_CorrectHash.w))
  {
    //unsigned short*pOut=(unsigned short*)pdOut+tid*8;
    unsigned short*pOut=(unsigned short*)pdOut;
    for(i=0; i<d_nPasswordLen; i++)
      pOut[i]=aPwd[i];
  }
}
#define F(b,c,d) ((((c)^(d)) & (b))^(d))
#define G(b,c,d) ((((b)^(c)) & (d))^(c))
#define H(b,c,d) ((b)^(c)^(d))
#define I(b,c,d) (((~(d))|(b))^(c))
#define ROTATE(a,n) (((a)<<(n))|(a)>>(32-n))))
#define R0(a,b,c,d,k,s,t) {\
    a+=((k)+(t)+F((b),(c),(d))); \
    a=ROTATE(a,s); \
    a+=b;};\
#define R1(a,b,c,d,k,s,t) {\
    a+=((k)+(t)+G((b),(c),(d))); \
    a=ROTATE(a,s); \
    a+=b; {;
#define R2(a,b,c,d,k,s,t) {\
    a+=((k)+(t)+H((b),(c),(d))); \
    a=ROTATE(a,s); \
    a+=b; {;
#define R3(a,b,c,d,k,s,t) {\
    a+=((k)+(t)+I((b),(c),(d))); \
    a=ROTATE(a,s); \
    a+=b; {;
_device_void md5_transform(void*pData, uint4& hash) {
  //MD5 chaining variables
```

```
uint4 state={0x67452301, 0xefcdab89, 0x98badcfe,
    0x10325476};
uint4 init=state;
uint4 data[4];
data[0]=*((uint4*)pData);
data[1]=*((uint4*)pData+1);
data[2]=*((uint4*)pData+2);
data[3]=*((uint4*)pData+3);
//Round 0
R0(state.x,state.y,state.z,state.w,data[0].x,
    7,0xd76aa478L);
R0(state.w,state.x,state.y,state.z,data[0].y,12,
    0xe8c7b756L);
R0(state.z,state.w,state.x,state.y,data[0].z,17,0x242070
    dbL);
R0(state.y,state.z,state.w,state.x,data[0].w,22,0xc1bd-
    ceeeL);
R0(state.x,state.y,state.z,state.w,data[1].x,
    7,0xf57c0fafL);
R0(state.w,state.x,state.y,state.z,data[1].y,12,
    0x4787c62aL);
R0(state.z,state.w,state.x,state.y,data[1].z,17,
    0xa8304613L);
R0(state.y,state.z,state.w,state.x,data[1].w,22,
    0xfd469501L);
R0(state.x,state.y,state.z,state.w,data[2].x,
    7,0x698098d8L);
R0(state.w,state.x,state.y,state.z,data[2].y,12,
    0x8b44f7afL);
R0(state.z,state.w,state.x,state.y,data[2].z,17,
    0xffff5bb1L);
R0(state.y,state.z,state.w,state.x,data[2].w,22,
    0x895cd7beL);
R0(state.x,state.y,state.z,state.w,data[3].x,
    7,0x6b901122L);
R0(state.w,state.x,state.y,state.z,data[3].y,12,
    0xfd987193L);
R0(state.z,state.w,state.x,state.y,data[3].z,17,
    0xa679438eL);
R0(state.y,state.z,state.w,state.x,data[3].w,22,
    0x49b40821L);
//Round 1
R1(state.x,state.y,state.z,state.w,data[0].y,
    5,0xf61e2562L);
R1(state.w,state.x,state.y,state.z,data[1].z,
    9,0xc040b340L);
R1(state.z,state.w,state.x,state.y,data[2].w,14,
    0x265e5a51L);
R1(state.y,state.z,state.w,state.x,data[0].x,20,
    0xe9b6c7aaL);
R1(state.x,state.y,state.z,state.w,data[1].y, 5,0xd62f105
    dL);
R1(state.w,state.x,state.y,state.z,data[2].z,
    9,0x02441453L); R1(state.z,state.w,state.x,state.y,data
    [3].w,14,0xd8a1e681L);
R1(state.y,state.z,state.w,state.x,data[1].x,20,
    0xe7d3fbc8L);
R1(state.x,state.y,state.z,state.w,data[2].y, 5,0x21
    e1cde6L);
R1(state.w,state.x,state.y,state.z,data[3].z,
    9,0xc33707d6L);
R1(state.z,state.w,state.x,state.y,data[0].w,14,
    0xf4d50d87L);
R1(state.y,state.z,state.w,state.x,data[2].x,20,
    0x455a14edL);
R1(state.x,state.y,state.z,state.w,data[3].y,
    5,0xa9e3e905L);
R1(state.w,state.x,state.y,state.z,data[0].z,
    9,0xfcefa3f8L);
R1(state.z,state.w,state.x,state.y,data[1].w,14,
    0x676f02d9L);
R1(state.y,state.z,state.w,state.x,data[3].x,20,
    0x8d2a4c8aL);
//Round 2
R2 (state.x,state.y,state.z,state.w,data[1].y,
    4,0xfffa3942L);
R2(state.w,state.x,state.y,state.z,data[2].x,11,
    0x8771f681L);
R2(state.z,state.w,state.x,state.y,data[2].w,16,
    0x6d9d6122L);
R2(state.y,state.z,state.w,state.x,data[3].z,23,
    0xfde5380cL);
R2(state.x,state.y,state.z,state.w,data[0].y,
    4,0xa4beea44L);
R2(state.w,state.x,state.y,state.z,data[1].x,11,
    0x4bdecfa9L);
R2(state.z,state.w,state.x,state.y,data[1].w,16,
    0xf6bb4b60L);
R2(state.y,state.z,state.w,state.x,data[2].z,23,
    0xbebfbc70L);
R2(state.x,state.y,state.z,state.w,data[3].y,
    4,0x28967ec6L);
R2(state.w,state.x,state.y,state.z,data[0].x,11,
    0xeaa127faL);
R2(state.z,state.w,state.x,state.y,data[0].w,16,
    0xd4ef3085L);
R2(state.y,state.z,state.w,state.x,data[1].z,23,0x04881
    dO5L);
R2(state.x,state.y,state.z,state.w,data[2].y,
    4,0xd9d4d039L);
R2(state.w,state.x,state.y,state.z,data[3].x,11,0xe6
    db99e5L);
R2(state.z,state.w,state.x,state.y,data[3].w,16,
    0x1fa27cf8L);
R2(state.y,state.z,state.w,state.x,data[0].z,23,
    0xc4ac5665L);
//Round 3
R3(state.x,state.y,state.z,state.w,data[0].x,
    6,0xf4292244L);
R3    (state.w,state.x,state.y,state.z,data[1].w,10,
    0x432aff97L);
R3  (state.z,state.w,state.x,state.y,data[3].z,15,0xab9423
    a7L);
R3    (state.y,state.z,state.w,state.x,data[1].y,21,0xfc93
    a039L);
R3        (state.x,state.y,state.z,state.w,data[3].x,
    6,0x655b59c3L);
R3        (state.w,state.x,state.y,state.z,data[0].w,10,
    0x8f0ccc92L);
R3        (state.z,state.w,state.x,state.y,data[2].z,15,
    0xffeff47dL);
R3    (state.y,state.z,state.w,state.x,data[0].y,21,0x85845
    dd1L);
R3(state.x,state.y,state.z,state.w,data[2].x,
    6,0x6fa87e4fL);
R3        (state.w,state.x,state.y,state.z,data[3].w,10,
    0xfe2ce6e0L);
R3        (state.z,state.w,state.x,state.y,data[1].z,15,
    0xa3014314L);
R3        (state.y,state.z,state.w,state.x,data[3].y,21,
    0x4e0811a1L);
R3        (state.x,state.y,state.z,state.w,data[1].x,
    6,0xf7537e82L);
```

```
R3      (state.w,state.x,state.y,state.z,data[2].w,10,0xbd3
   af235L);
R3      (state.z,state.w,state.x,state.y,data[0].z,15,0x2
   ad7d2bbL);
R3            (state.y,state.z,state.w,state.x,data[2].y,21,
   0xeb86d391L);
state.x+=init.x;
state.y+=init.y;
state.z+=init.z;
state.w+=init.w;
hash=state;
}
```

With reference to FIG. 4, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. In a computer system having a central processing unit (CPU) and a graphics processing unit (GPU), a method of recovering a password used to encrypt a plaintext, the method comprising:
    (a) generating N passwords on the CPU;
    (b) providing the N passwords to the GPU;
    (c) for each of the N passwords, calculating a transformed value from the password on the GPU, wherein the calculating is performed in parallel for all the N passwords provided to the GPU;
    (d) providing the N transformed values to the CPU;
    (e) at the CPU, testing the N transformed values for correctness; and
    (f) if none of the N transformed values are correct, repeating steps (a)-(e) for the next set of N passwords;
    (g) informing the user of a correct password.

2. In a computer system having a central processing unit (CPU) and a graphics processing unit (GPU), a method of recovering a password used to encrypt a plaintext, the method comprising:
    (a) generating an initial password on the CPU;
    (b) providing the initial password to the GPU;
    (c) from the initial passwords, generating N passwords on the GPU;
    (d) for each of the N generated passwords, calculating a transformed value from the password on the GPU, wherein the calculating is performed in parallel for all the N generated passwords;
    (d) at the GPU, testing the N transformed values for correctness
    (e) if none of the N transformed values are correct, repeating steps (a)-(e) for the next set of N passwords, until the correct password is found;

(f) providing the correct password to the CPU; and
(g) informing the user of a correct password.

3. In a computer system having a central processing unit (CPU) and a graphics processing unit (GPU), a system for recovering a password used to encrypt a plaintext, the method comprising:
- (a) means for generating N passwords on the CPU;
- (b) means for providing the N passwords to the GPU;
- (c) for each of the N passwords, means for calculating a transformed value from the password on the GPU, wherein the calculating is performed in parallel for all the N passwords provided to the GPU;
- (d) means for providing the N transformed values to the CPU;
- (e) at the CPU, means for testing the N transformed values for correctness; and
- (f) if none of the N transformed values are correct, means for repeating steps (a)-(e) for the next set of N passwords;
- (g) means for informing the user of a correct password.

4. In a computer system having a central processing unit (CPU) and a graphics processing unit (GPU), a system for recovering a password used to encrypt a plaintext, the method comprising:
- (a) means for generating an initial password on the CPU;
- (b) means for providing the initial password to the GPU;
- (c) from the initial passwords, means for generating N passwords on the GPU;
- (d) for each of the N generated passwords, means for calculating a transformed value from the password on the GPU, wherein the calculating is performed in parallel for all the N generated passwords;
- (d) at the GPU, means for testing the N transformed values for correctness
- (e) if none of the N transformed values are correct, means for repeating steps (a)-(e) for the next set of N passwords, until the correct password is found;
- (f) means for providing the correct password to the CPU; and
- (g) means for informing the user of a correct password.

5. In a computer system having a central processing unit (CPU) and a graphics processing unit (GPU), a method of recovering a password used to encrypt a plaintext, the method comprising:
- (a) generating a plurality of passwords on the CPU;
- (b) providing the plurality of password to the GPU;
- (c) for each of the plurality of passwords, calculating a hash value from the password on the GPU, wherein the calculating is performed in parallel for all the generated passwords;
- (d) at the CPU, testing the hash values for correctness;
- (e) if none of the hash values are correct, repeating steps (a)-(d) for the next set of passwords, until the correct password is found; and
- (f) informing the user of a correct password.

6. In a computer system having a central processing unit (CPU) and a graphics processing unit (GPU), a method of recovering a password used to encrypt a plaintext, the method comprising:
- (a) generating a plurality of passwords on the CPU;
- (b) for each of the passwords, generating, on the CPU, a first hash value;
- (c) providing the plurality of first hash values to the GPU;
- (d) for each of the plurality of first hashes, calculating, on the GPU, an iterative hash value, wherein the calculating is performed in parallel for all the generated passwords;
- (e) at the CPU, testing the iterative hash values for correctness;
- (f) if none of the hash values are correct, repeating steps (a)-(e) for the next set of passwords, until the correct password is found; and
- (g) informing the user of a correct password.

* * * * *